United States Patent
Cabrera et al.

(12) 
(10) Patent No.: US 6,381,394 B1
(45) Date of Patent: Apr. 30, 2002

(54) METHOD AND APPARATUS FOR ASSEMBLING AN AMPLIFIER ASSEMBLY

(75) Inventors: Armando Cabrera, Oakhurst; Victor J. Talamini, Asbury, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/389,471

(22) Filed: Sep. 3, 1999

(51) Int. Cl.[7] .................................................. G02B 6/00

(52) U.S. Cl. ........................ 385/135; 385/92; 359/341.1

(58) Field of Search ................................. 385/134–137, 385/88, 89, 92; 359/341

(56) References Cited

U.S. PATENT DOCUMENTS

| | | | |
|---|---|---|---|
| 5,402,515 A | * | 3/1995 | Vidacovich et al. ......... 385/135 |
| 5,642,219 A | * | 6/1997 | Ogiya et al. ................. 359/341 |
| 5,646,775 A | | 7/1997 | Delrosso et al. ............. 359/341 |
| 5,778,132 A | | 7/1998 | Csipkes et al. .............. 385/135 |

* cited by examiner

*Primary Examiner*—John D. Lee
*Assistant Examiner*—Sarah U Song

(57) ABSTRACT

An optical repeater includes an internal structure having defined therein a longitudinal plane. The internal structure includes and a plurality of base modules. The base modules have a front and a back face and a plurality of sides with the faces positioned substantially perpendicular to the longitudinal plane of the internal structure. The optical repeater further includes a top module disposed substantially perpendicular to one of the plurality of sides the base modules.

24 Claims, 13 Drawing Sheets

METHOD AND APPARATUS FOR ASSEMBLING AN AMPLIFIER ASSEMBLY

CROSS-REFERENCE TO A RELATED PATENT APPLICATION

This patent application is related to commonly assigned U.S. patent application Ser. No. 09/317,643 filed May. 25, 1999, entitled "Improved Device for Storing Optical Fiber," filed by one of the inventors and incorporated herein by reference.

FIELD OF THE INVENTION

The present invention relates to the field of optical repeaters and, more particularly, to an apparatus and method for assembling amplifier assemblies for use in optical repeaters.

BACKGROUND OF THE INVENTION

In an undersea optical transmission system, optical signals that are transmitted through an optical fiber cable become attenuated over the length of the cable, which may span thousands of miles. To compensate for this signal attenuation, optical repeaters are strategically positioned along the length of the cable.

In a typical optical repeater, the optical fiber cable carrying the optical signal enters the repeater and is coupled through at least one amplifier and various components, such as optical couplers and decouplers, before exiting the repeater. These optical components are coupled to one another via optical fibers as well. Repeaters are housed in a sealed structure that protects the repeaters from environmental damage.

FIG. 1 illustrates a known submarine optical repeater 2 having a cylindrical member 4 and a pair of end plates 6 closing the opposite ends of the cylindrical member 4. An internal structure 8 including a radiating/shock absorbing member 7, is included within repeater 2. The internal structure 8 has two module assemblies 10 and 12. Submarine optical cables 14 are connected to the opposite ends of optical repeater 2. Each submarine optical cable 14 has a power cable 16 for feeding a series constant current and has an optical fiber cable 18. The power cable 16 and the optical fiber cable 18 of each submarine optical cable 14 are introduced into optical repeater 2 through a bushing 20 inserted through a substantially central portion of each end plate 6, and are connected electrically and optically to the internal structure 8.

FIG. 2 is a perspective view of one of the module assemblies (either module assembly 10 or 12) which is included in internal structure 8 as shown in FIG. 1. Typically, the module assembly includes a common module 70, a drive circuit module 72 provided on an upper side of common module 70 and a power supply module 74 provided on a lower side of the common module 70. The common module 70 has a common frame 80 consisting of an upper common frame 76 and a lower common frame 78 integrated together. The modules 72 and 74 are stacked together horizontally and can be clamped together by bolts or by any other method for connecting the modules. Each of these modules also includes a means for providing electrical and optical connections, which can include either interconnections between the modules or interconnections of the input and output power to and from power cable 16 and interconnections of input and output optical signal connections to and from optical cable 18.

As can be seen in FIG. 2, the optical interconnection 79 between the modules creates a tangled web of optical fibers that could be damaged as a result of, among other reasons, twisting, tangling or bending of the fibers. Moreover, incorporating additional module assemblies would greatly increase the complication of interconnection of the modules and could increase the size of the optical repeater. Finally, repairing any of the components in the repeater would be very difficult because of the complicated interconnection of the components.

Therefore, it would be desirable to provide an improved apparatus and method for arranging module assemblies in an optical repeater that would avoid greatly increasing the overall size of the optical repeater, protect interconnecting optical fibers, and provide accessibility for maintenance purposes.

SUMMARY OF THE INVENTION

An optical repeater includes an internal structure having defined therein a longitudinal plane. The internal structure includes and a plurality of base modules. The base modules have a front and a back face and a plurality of sides with the faces positioned substantially perpendicular to the longitudinal plane of the internal structure. The optical repeater further includes a top module disposed substantially perpendicular to one of the plurality of sides the base modules.

A method for assembling an optical repeater includes providing and internal structure and defining a longitudinal plane therein. The method also includes providing a plurality of modules having a front and a back face and a plurality of sides such that the faces of the base modules are positioned substantially perpendicular to the longitudinal plane of the internal structure. The method further includes providing a top module disposed substantially perpendicular to one of the plurality of sides of the base modules.

BRIEF DESCRIPTION OF THE DRAWINGS

The various features of the invention will best be appreciated by simultaneous reference to the description which follows and the accompanying drawings, in which.

DETAILED DESCRIPTION

An optical repeater includes an internal structure having defined therein a longitudinal plane. The internal structure includes a plurality of base modules. The base modules have a front and a back face and a plurality of sides. The plurality of base modules are combined to form a module assembly. The base modules are positioned such that the front and back faces are substantially perpendicular to the longitudinal plane of the internal structure. In addition, the base modules are positioned such that the longitudinal plane intersects each of the face of the base modules. The optical repeater further includes a top module disposed substantially perpendicular to one of the plurality of sides of the base modules. The top module includes a spool structure that is adapted to accommodate optical fibers from the base modules. As used herein, the term "substantially perpendicular" refers to, but not limited to, lines or planes intersecting at or forming right angles, plus or minus about 10 degrees.

Positioning the faces of the base modules perpendicular to the longitudinal plane allows for multiple module assemblies to be included in a single optical repeater and reduces the overall size of the optical repeater. In addition, positioning the faces of the base modules perpendicular to the longitudinal plane of the internal structure allows for additional channels to be incorporated in the optical repeater.

Although embodiments of the represent invention are discussed primarily with respect to the optical repeater being substantially longitudinal in shape, the orientation and shape of the optical repeater has been selected merely for convenience and for clarity in explaining the present invention. Thus, the term "positioned perpendicular to the longitudinal plane" is used herein to include the relationship between the faces of the base modules and a longitudinal plane of the internal structure when the optical repeater is substantially longitudinal in shape. In an alternative embodiment, the optical repeater could be substantially lateral in shape. With this arrangement, the faces of the base modules would be positioned substantially parallel to the longitudinal plane and the faces of each of the base modules would not intersect the longitudinal plane.

With respect to the top module, this module is on the "top" with respect to the drawings for convenience only. The top module may not necessarily be oriented on the top depending on how the optical repeater is oriented.

Figure 3:
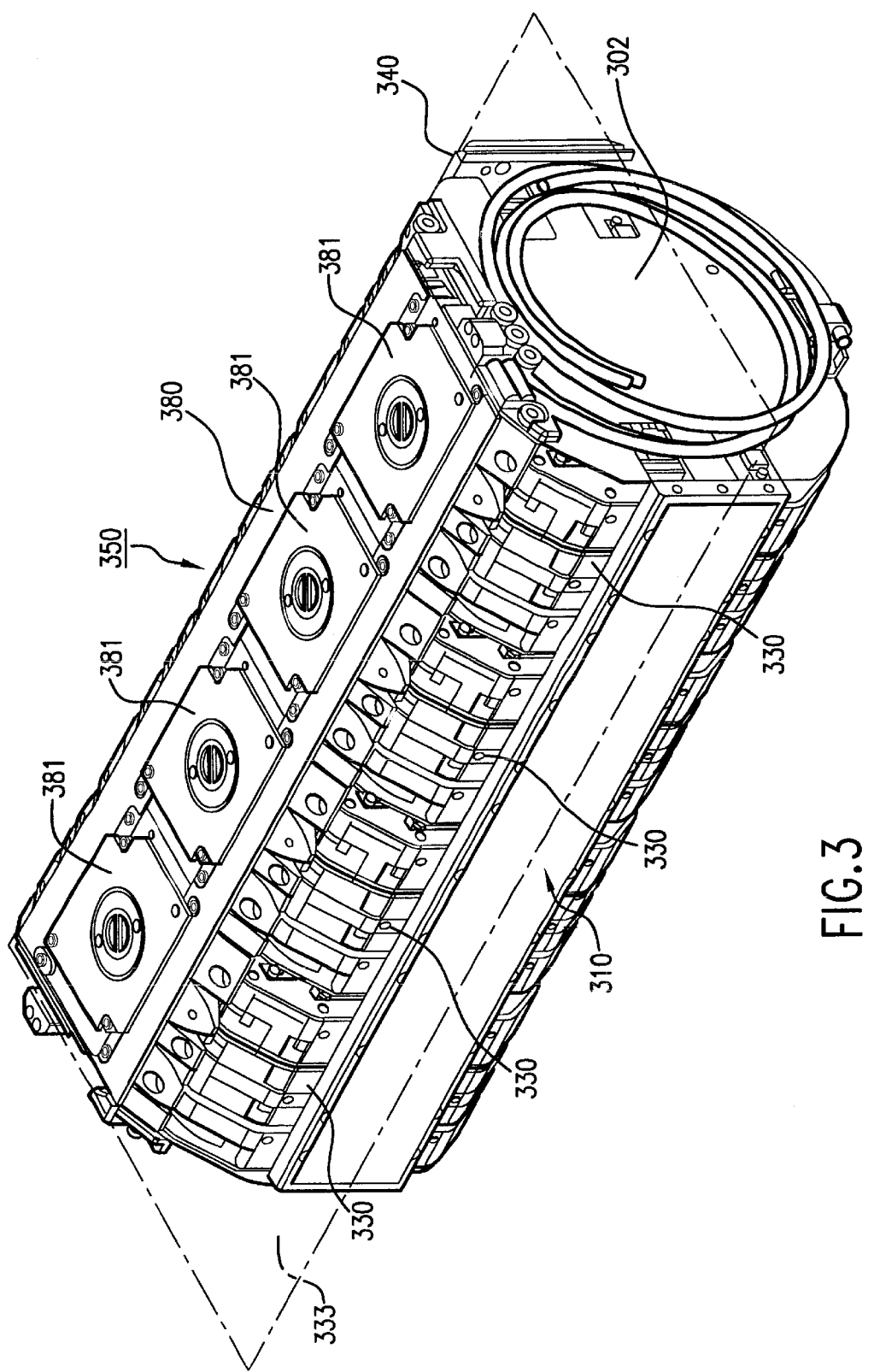
FIG. 3 is a perspective view of an inner structure of an optical repeater to which embodiments of the present invention is applicable.

FIG. 3 illustrates a perspective view of the internal structure of an optical repeater 350 according to an embodiment of the present invention. As can be seen in FIG. 3, internal structure of optical repeater 350 may be defined as a structure having at least four sides and two ends. Internal structure 350 is substantially cylindrical. For purposes of reference, cylindrical shaped internal structure 350 defines a longitudinal plane 333. In one embodiment, the sides are flattened portions that extend longitudinally along the length of internal structure 350. The sides include a power supply assembly 301 (shown in FIG. 14), a heat transfer plate 310, a spring plate 340 and a network cover 380. Although the sides are arranged as shown in the figures, other arrangements are also possible without departing from spirit of the present invention. Internal structure 350 also includes mounting plates 302 and 303 (shown in FIG. 14) located at each end.

In further describing internal structure 350, module assemblies 330 also referred to as amplifier pairs or "amp pairs" are also included. Each amp pair 330 can include, for example, a pump unit assembly tray, an erbium doped fiber amplifier assembly tray, and a High Loss Loop Back (HLLB) assembly tray each of which is assembled in base modules 320, 321 and 322, respectively, (shown in FIG. 4). The amp pairs are detachably mounted to internal structure 350 either by clamping, fastening or other methods.

Figure 14:
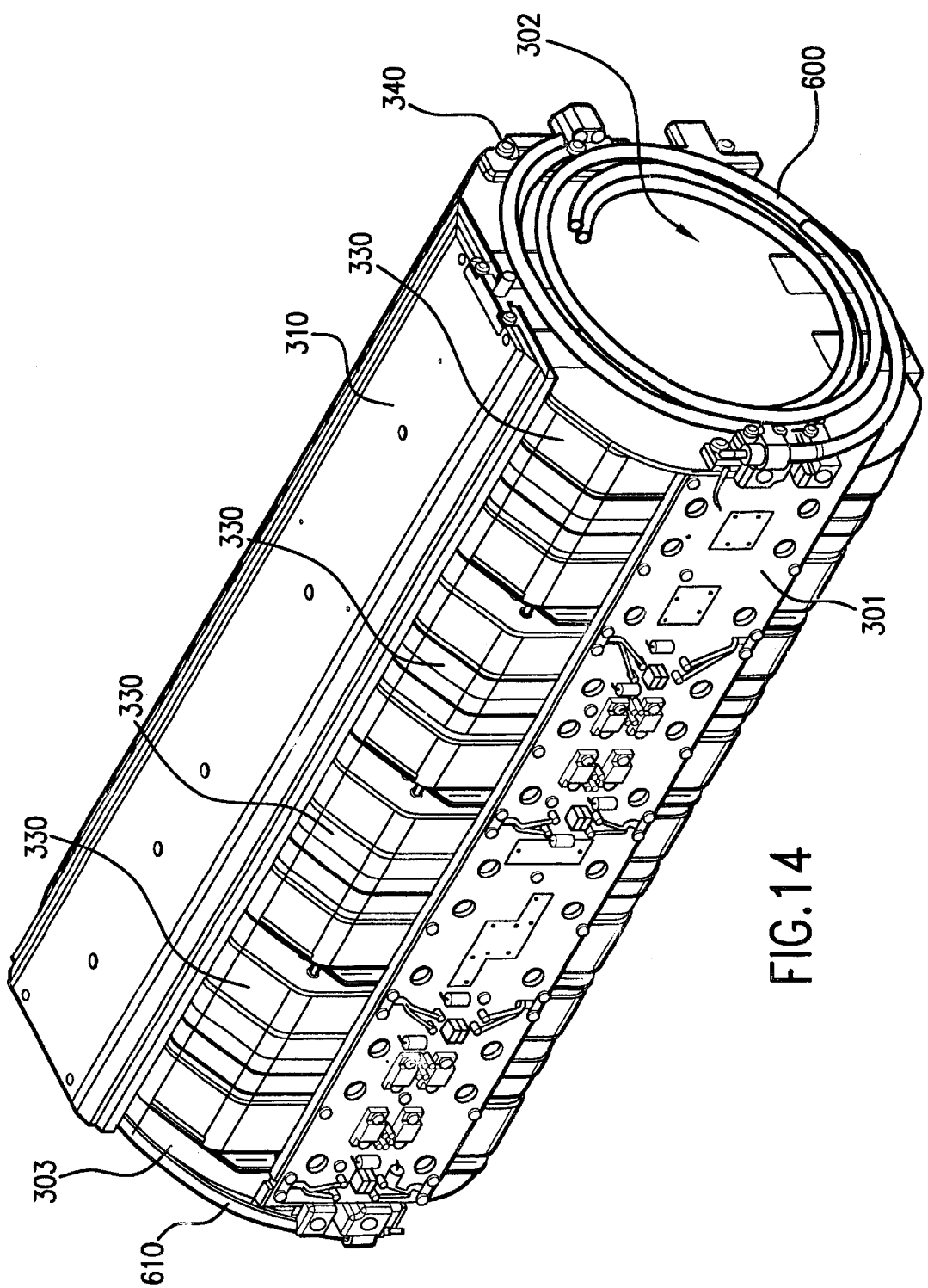
FIG. 14 is a perspective view of the inner structure of the optical repeater to which embodiments of the present invention is drawn.

As can be seen in FIG. 14, the power supply assembly 301, spring plate 340 and heat transfer plate 310 are detachably connected to the amp pairs 330 and mounting plate 302 by any type of mating device. Mounting plate 302 can store optical fiber cable 600 which has a power conductor for providing electrical power to the amp pair via power supply assembly 301. Mounting plate 303 includes similar features as mounting plate 302, and can store an optical fiber 610.

Figure 5:
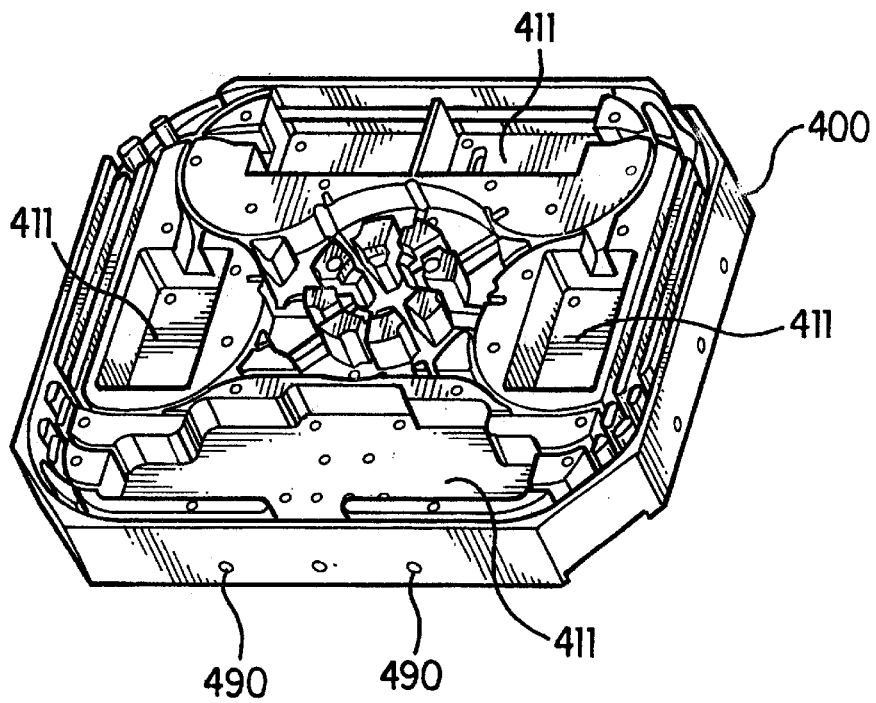
FIG. 5 is a top perspective view of a base module where shown in FIG. 3.
Figure 6:
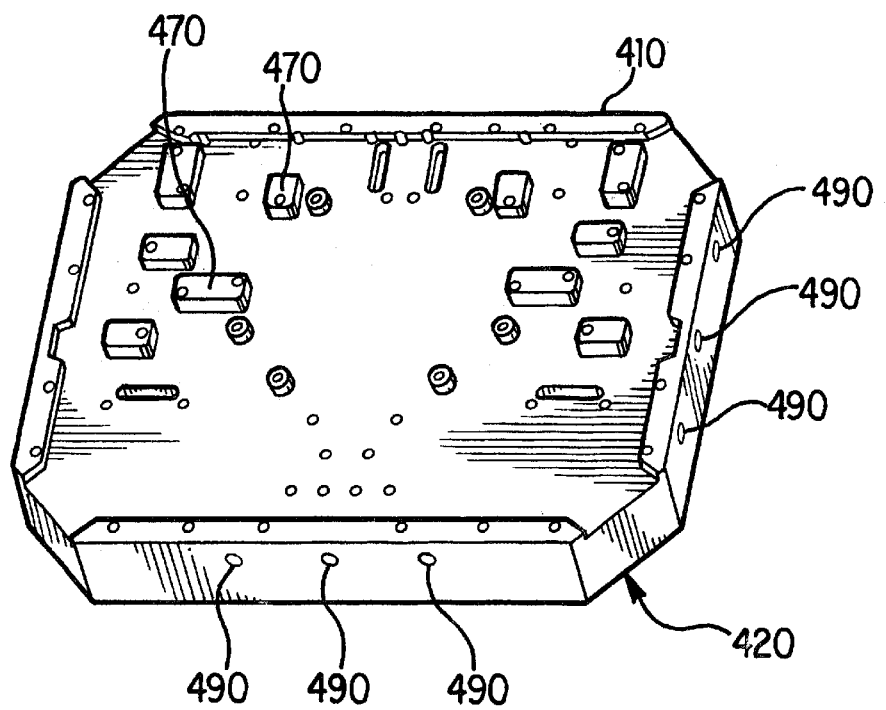
FIG. 6 is a bottom perspective view of the base module where shown in FIG. 5.

A more detailed description will now be provided for the previously described base modules. As shown in FIG. 5, each base module can be substantially rectangular in shape and includes a front face 400 and an underside or back face 410 (shown in FIG. 6). Front face 400 defines a plurality of channels 411 in which can be stored optical components and defines grooves in which optical fiber can be used to connect optically the optical components as will be further described later in this detailed description. Each base module also includes a plurality of side 401, 402, 403 (not shown) and 404 (not shown) having apertures 490 provided thereon through which can be passed press fit pins (not shown) for fastening the base modules together to form the amp pair and for fastening the amp pair to internal structure 350 so that the amp pair is firmly supported.

Base modules 320, 321 and 322 are positioned in internal structure 350 defined by mounting plates 302 and 303, power supply assembly 301, heat transfer plate 310 and spring plate 340 (shown in FIG. 14) and substantially perpendicular to longitudinal plane 333. Each amp pair includes a top module 370. For example, top module 370 can be disposed substantially perpendicular to one of the plurality of sides of the base modules. In sum, top module 370 is disposed on the base modules in an arrangement not parallel to the faces of the base modules.

Figure 7:
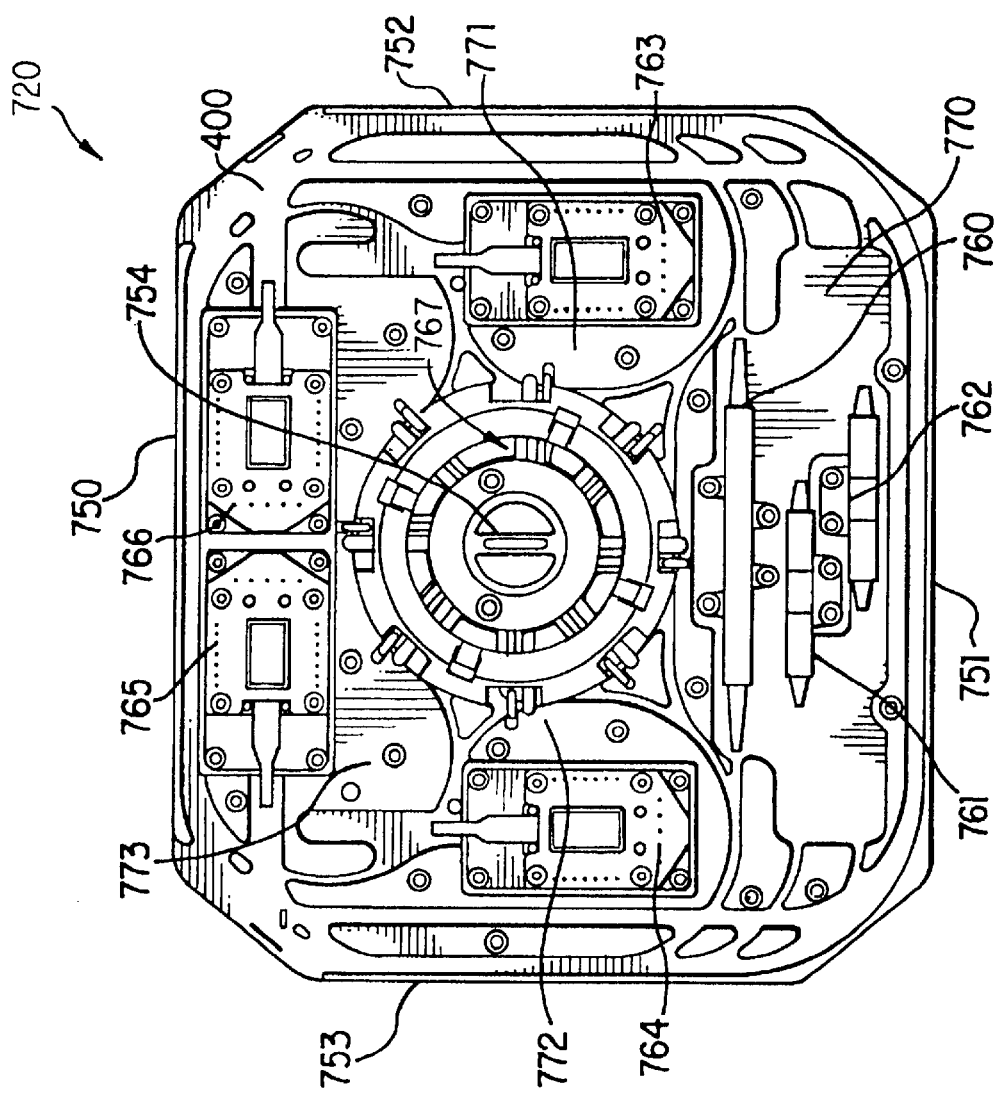
FIG. 7 is a top perspective view of a pump unit assembly tray according to an embodiment of the invention.

As described previously, one of the base modules can be a pump unit assembly tray. A pump unit assembly tray can include one or more pump laser used to pump light to doped fibers. FIG. 7 for example, shows a possible embodiment of a pump unit assembly tray. Pump unit assembly tray 320 includes a top portion 750, a bottom portion 751, a right portion 752, a left portion 753, and a center portion 754 provided on front face 400. As shown in FIG. 7, a 3 dB coupler 760 and wave division multiplexed combiners 761 and 762 are provided in channel 770 of bottom portion 751. Laser pump module 763 is provided in channel 771 of right portion 752 and laser pump module 764 is provided in channel 772 of left portion 753. Also included are laser pump modules 765 and 766 provided in channel 773 of top portion 750. A storage device 767 is mounted in the center portion 754 of base module 720 for winding optical fibers for optical wiring around the front face 400 of base module 320.

Figure 8:
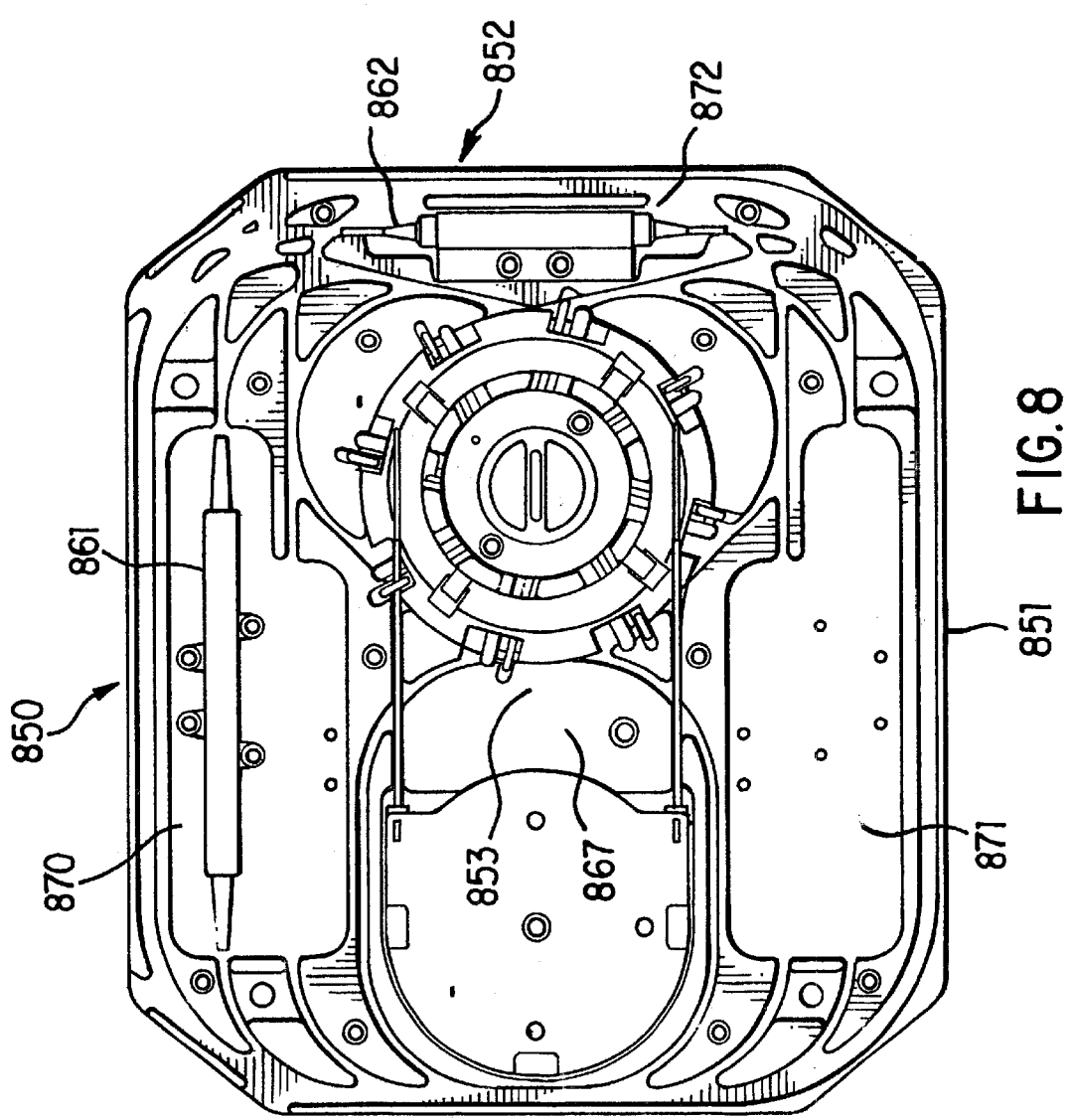
FIG. 8 is a top perspective view of an Erbium Doped Fiber Amplifier (EDFA) assembly tray according to an embodiment of the invention.

Another base module could be an amplifier assembly tray. An amplifier assembly tray includes optical components used with an optical fiber doped with a rare earth element such as Er, Nd, and Yd (referred to as "rare-earth-doped fiber") for amplifying a signal. FIG. 8 for example, shows a possible embodiment of an Erbium Doped Fiber Amplified (EDFA) assembly tray. EDFA assembly tray includes a top portion 850, a bottom portion 851, a right portion 852, and a center portion 853 provided on front face 400. As shown in FIG. 8, a wave division multiplex coupler 861 is provided in channel 870 of top portion 850. An isolator/filter 862 is provide in channel 872 of right portion 852. Bottom portion 851 includes channel 871 used to store other optical components. Center portion 853 includes a storage device 867 for winding optical fibers for optical wiring around front face 400.

Figure 4:
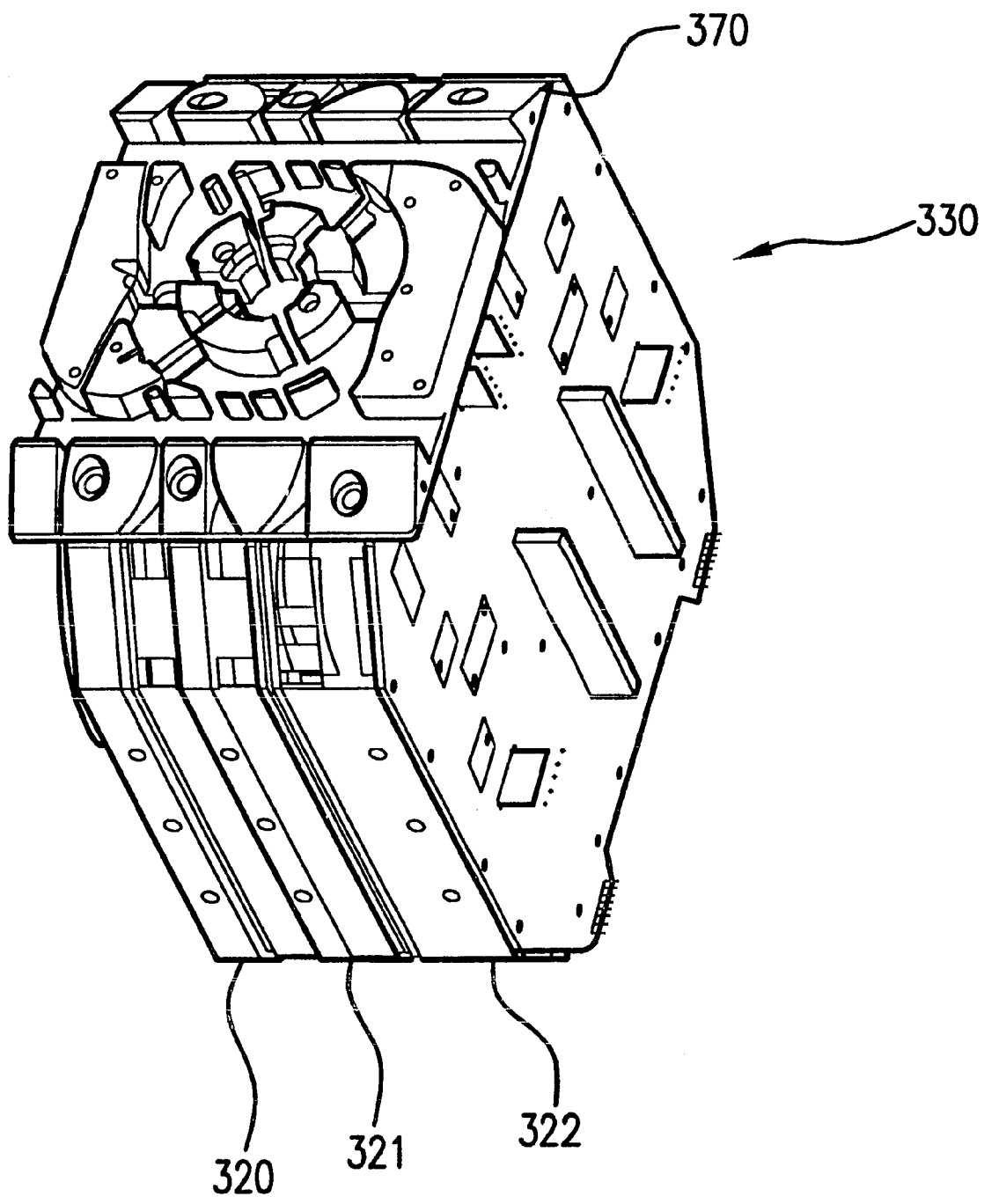
FIG. 4 is a perspective view of an amplifier assembly where shown in FIG. 3.

According to an embodiment of the present invention, two EDFA assembly trays are mounted together as shown in FIG. 4. Incorporating two EDFA assembly trays provides for bidirectional communication.

Figure 9:
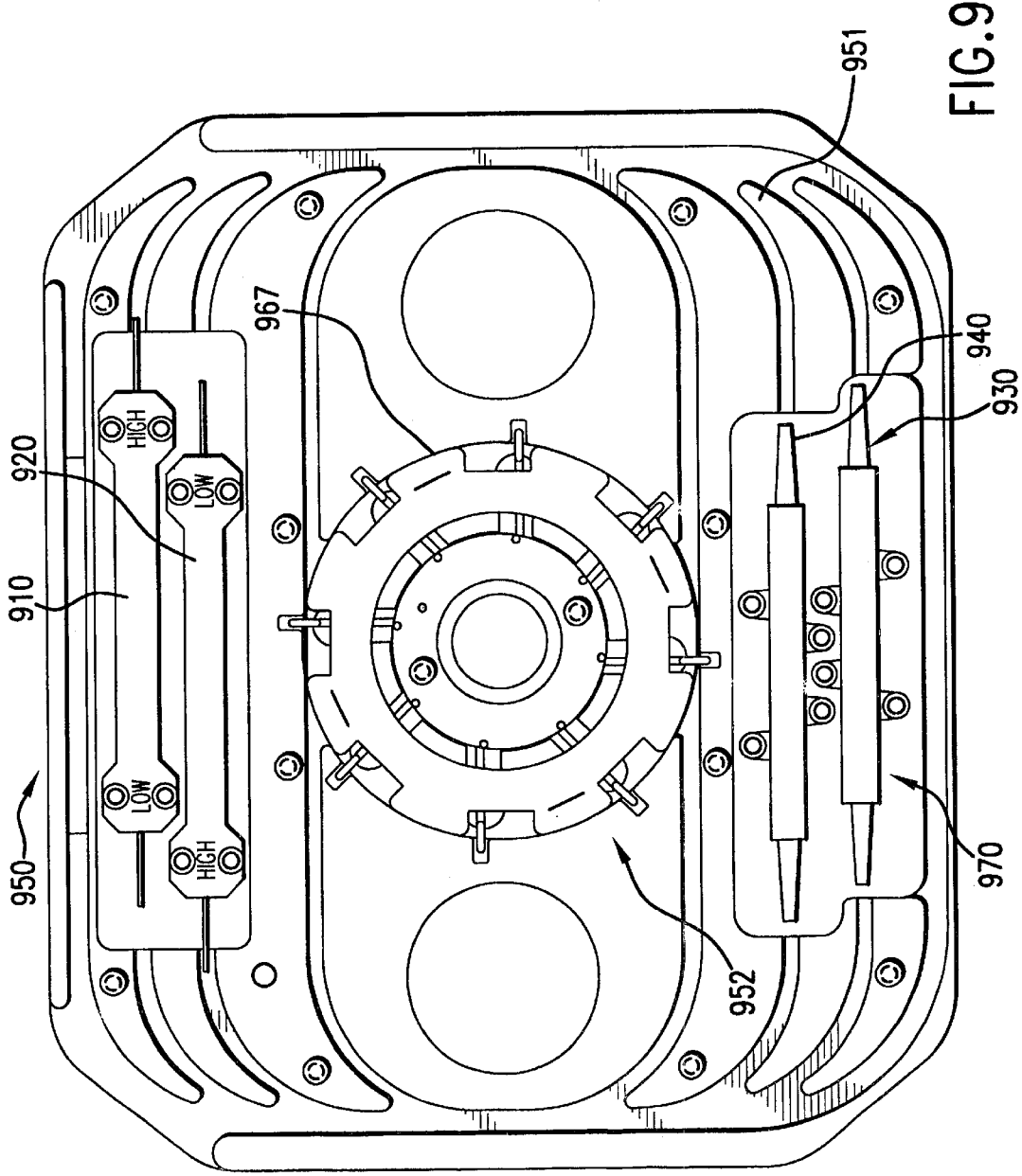
FIG. 9 is a top perspective view of a High Loss Loop Back (HLLB) assembly tray according to an embodiment of the invention.

Another base module could be a supervisory assembly tray which automatically controls the output level of the optical amplifier to a fixed value. FIG. 9 for example, shows a possible embodiment of a supervisory assembly tray such as a High Loss Loop Back (HLLB) assembly tray. The HLLB assembly tray may include a supervisory circuit which provides a loop back condition in response to a different signal compared with the signal provided by the EDFA assembly tray. HLLB assembly tray includes a top portion 950, a bottom portion 951, and a center portion 952 provided on front face 400. As shown in FIG. 9, a pair of 10.5 dB couplers 930 and 940 are provided in channel 970 of bottom portion 951. Also provided are a pair of grating filters (ISO-filters) 910 and 920 mounted on top portion 950. Center portion 952 includes a storage device 967 for winding optical fibers for optical wiring around front face 400.

Figure 10:
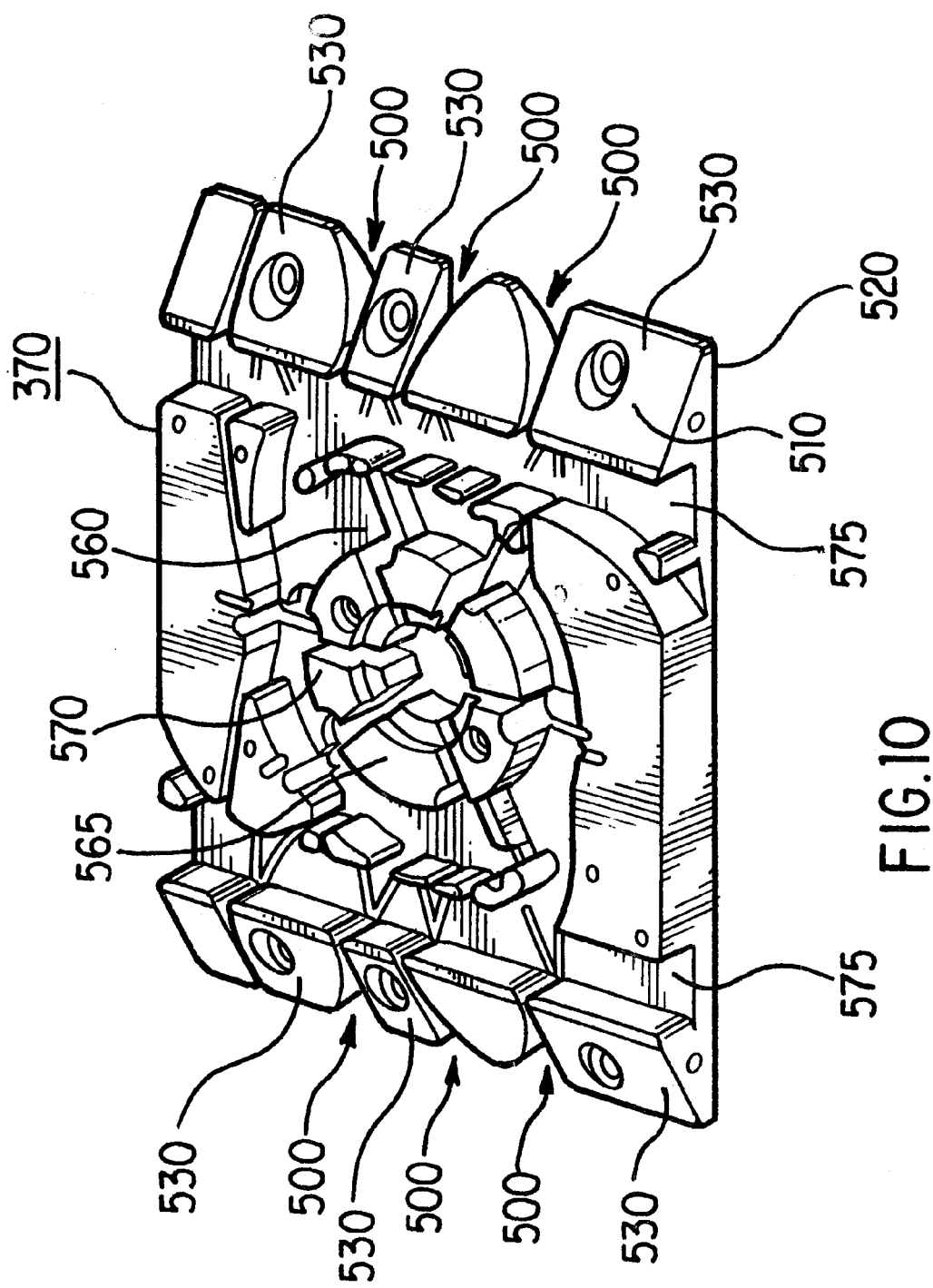
FIG. 10 is a top perspective view of a top module according to an embodiment of the invention.

A more detailed description will now be provided for the top module 370 as illustrated in FIG. 10. Top module 370 is generally rectangular in shape and includes a top side 510 and a bottom side 520. However, other shapes of top module are possible which allow for gathering of the optical fibers. Top module 370 further includes grooves 500 provided around opposite sides of its periphery to receive optical fibers from base modules 320, 321 and 322. Also included are channels 575 defined along two opposite portions of top side 510. The received optical fibers are wound and stored in a spool structure 570 defined in a center portion of top side 510. Typically, the optical fibers found within optical repeaters are circular in cross-section, and are constructed of glass surrounded by a protective jacket that is thicker than the glass. For example, a typical glass fiber can have an outer diameter of approximately 0.010 inches, and a typical jacketed fiber can have an outer diameter of approximately 0.040 to 0.060 inches.

As shown in FIG. 10 spool structure 570 includes a well structure 560 that extends partially through the thickness of top tray 370. Supported by well structure 560 is at least one elongated generally angular spool 565 around which optical fiber is spooled. The spool has outer diameters that at least meet a reliability-adjusted minimum bending radius of the optical fiber. As used herein, the term "reliability-adjusted minimum bending radius" refers to that radius value, below which, the portion of the fiber bent thereto has a significantly increased likelihood of experiencing substantial degradation of structural or optical properties during the predetermined design life of the fiber. The minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Figure 11:
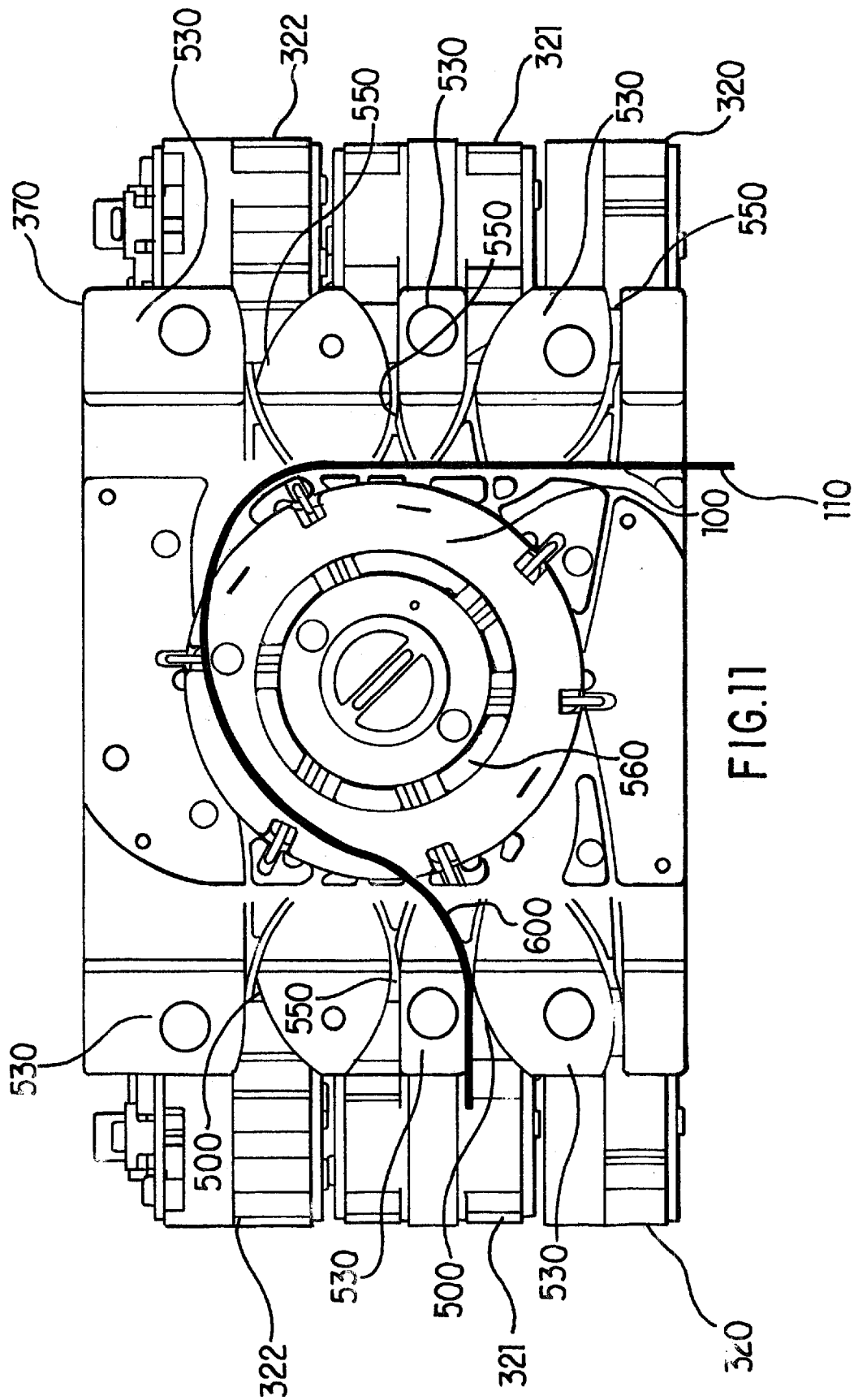
FIG. 11 is a top perspective view of a top module including a cover member according to an embodiment of the invention.

FIG. 11 illustrates top module 370 including a cover member 100. Cover member 100 is shown placed over well structure 560. Cover member 100 is used to support optical fiber 600 routed from the base modules via grooves 500, thus optically interconnecting each of the base modules together.

Figure 12:
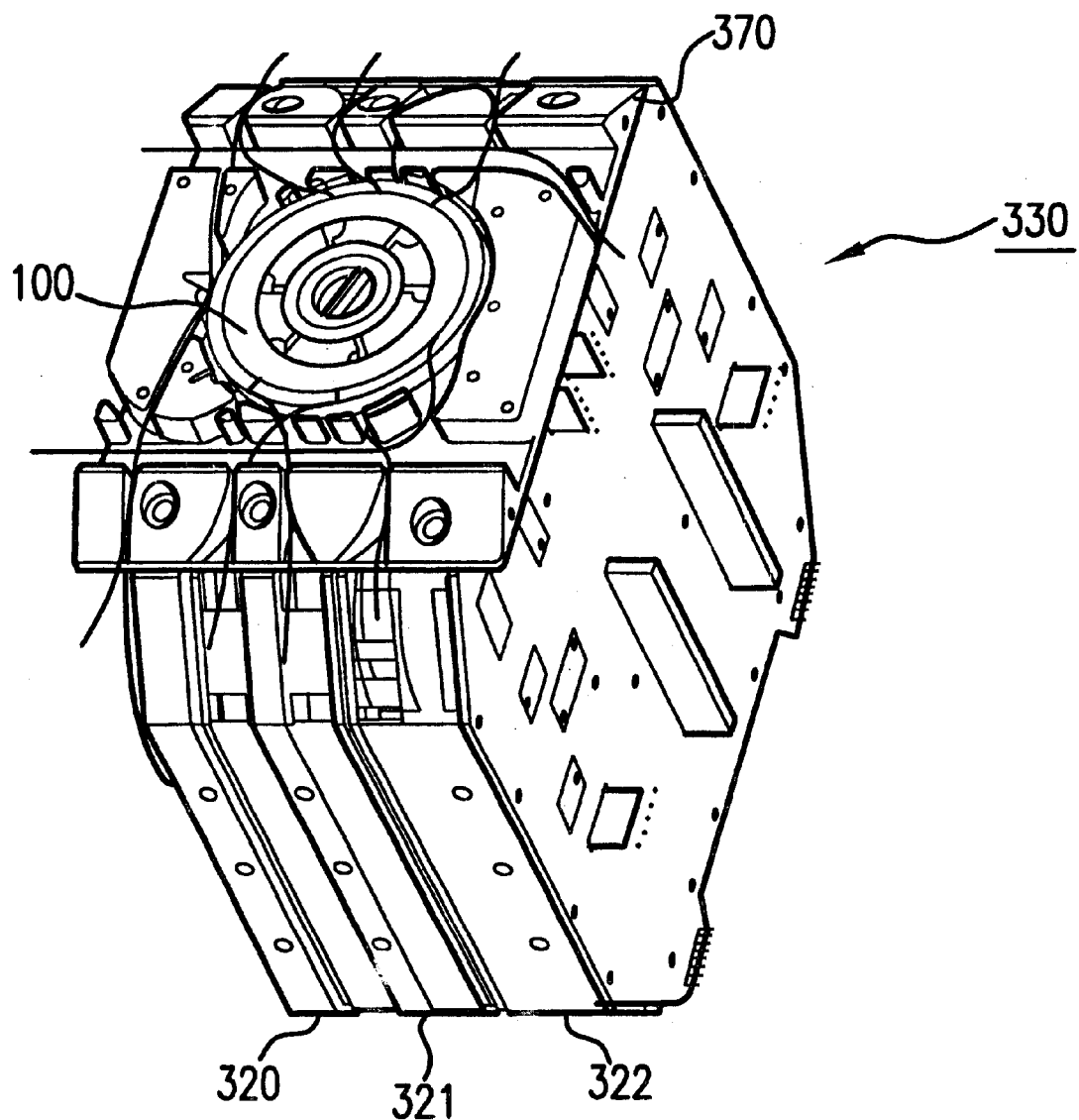
FIG. 12 is a perspective view of another embodiment of the amplifier assembly according to the present invention.
Figure 13:
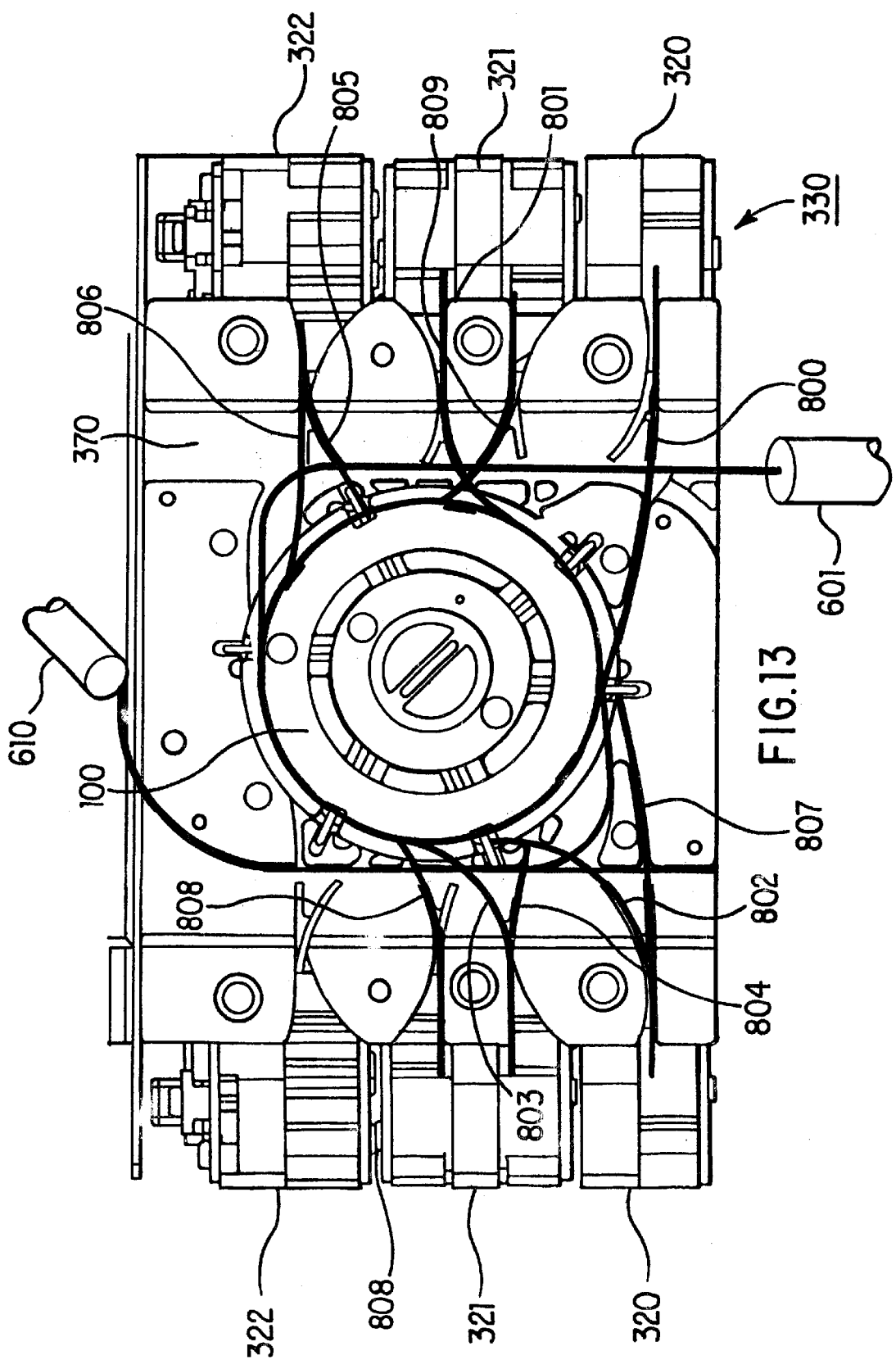
FIG. 13 is a top perspective view of the amplifier assembly shown in FIG. 12.

For the purpose of example only, FIGS. 12 and 13 illustrate an exemplary routing/splicing arrangement of the amplifier assembly according to one embodiment of the present invention. FIG. 12 illustrates a perspective view of module assembly 330 optically connecting each of the base modules 320–322. Compared with the known repeater in FIG. 2 which illustrates a tangled, twisted array of optical fibers optically interconnecting the modules, module assembly 330 illustrates, however, a neatly configured arrangement optically interconnecting the base modules in one central location. This arrangement prevents optical fiber from being damaged or destroyed.

FIG. 13 shows a top perspective view of module assembly 330. In the embodiment, top module 370 is shown optically connecting base modules 320, 321 and 322 of module assembly 330 by splicing and routing optical fibers 800–809. For example, optical fiber 803 from a wave division multiplexed (WDM) combiner (not shown) located on EDFA-1 assembly tray is routed around cover member 100 to optical fiber cable 600. Likewise, optical fiber 801 from another WDM combiner (not shown) located on EDFA-2 assembly tray is routed around cover member 100 to optical fiber cable 610. In addition, optical fiber 802 from 10.5 dB coupler (not shown) of high loss loop back (HLLB) assembly tray is routed to optical fiber cable 610, via cover member 100 and optical fiber 800 from another 10.5 dB coupler (not shown) of HLLB assembly tray is routed to optical fiber cable 601, via cover member 100. As can be understood, while not illustrated in FIG. 13, many different routing arrangements can be configured without departing from the spirit and scope of the invention.

In further describing the routing arrangement of the present invention, FIG. 13 also discloses optical fibers from the various modules being spliced together for optically connecting amp pair 330. As shown in FIG. 13, optical fiber 804 from WDM combiner (not shown) of EDFA-1 assembly tray is spliced with optical fiber 805 of a 3 dB coupler (not shown) from the pump unit assembly tray. Likewise, optical fiber 801 is spliced with optical fiber 806 of another 3 dB coupler (not shown) from the pump unit assembly tray. An additional splicing arrangement can include optical fiber 807 from ISO-filter (not shown) of EDFA-2 assembly tray spliced with optical fiber 808 from a 10.5 dB coupler of HLLB assembly tray. Likewise optical fiber 809 from ISO-filter (not shown) of EDFA-1 assembly tray can be spliced with optical fiber 808. As stated above with respect to the routing arrangements, many different splicing arrangements can be configured without departing from the spirit and scope of the invention.

Referring back to FIG. 11, apertures 550 are defined in flanges 530 which are used in combination with any type of mating device to secure top module 370 to the base modules. With this arrangement, amp pairs can be repaired and replaced more easily. Moreover, by incorporating top module 370 and optically interconnecting the base modules, the optical fibers are protected from damage.

Figure 1:
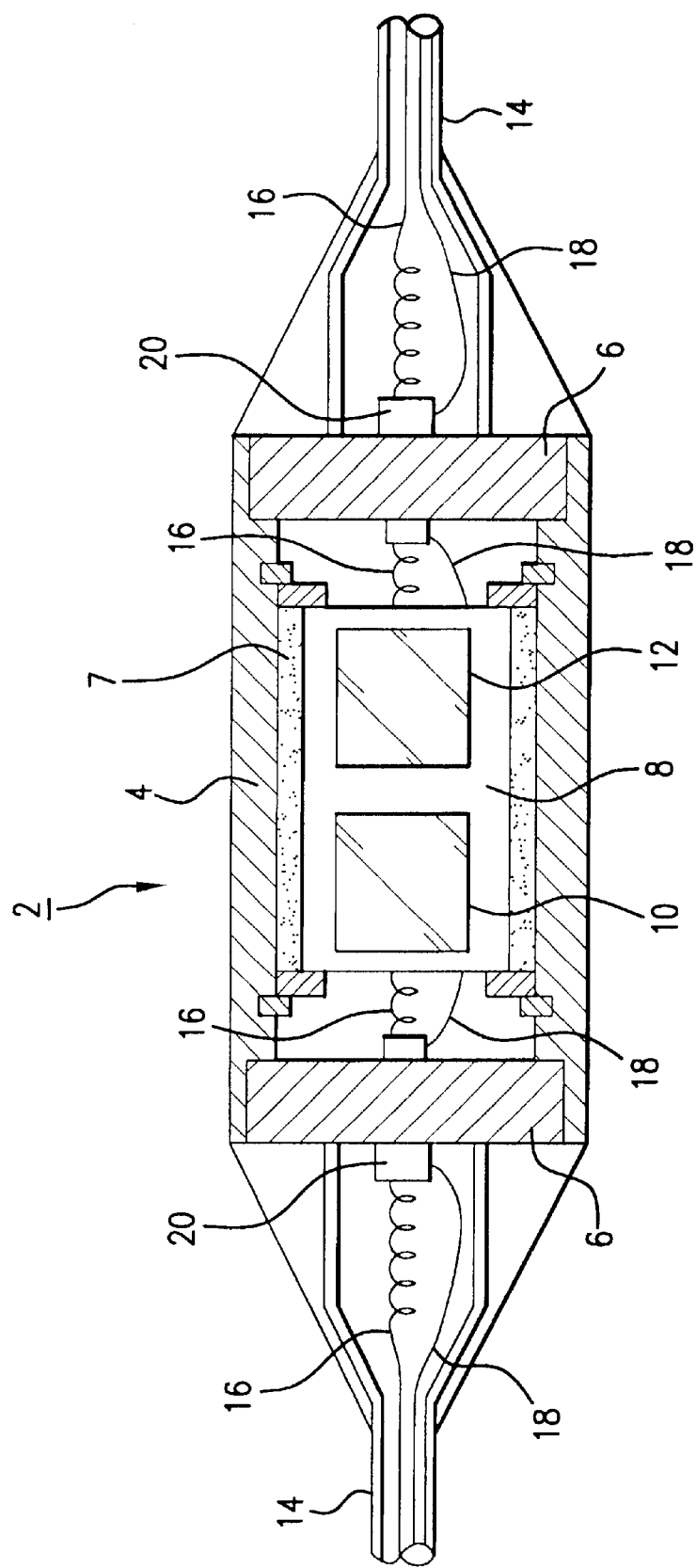
FIG. 1 is a sectional view of a typical optical repeater.
Figure 2:
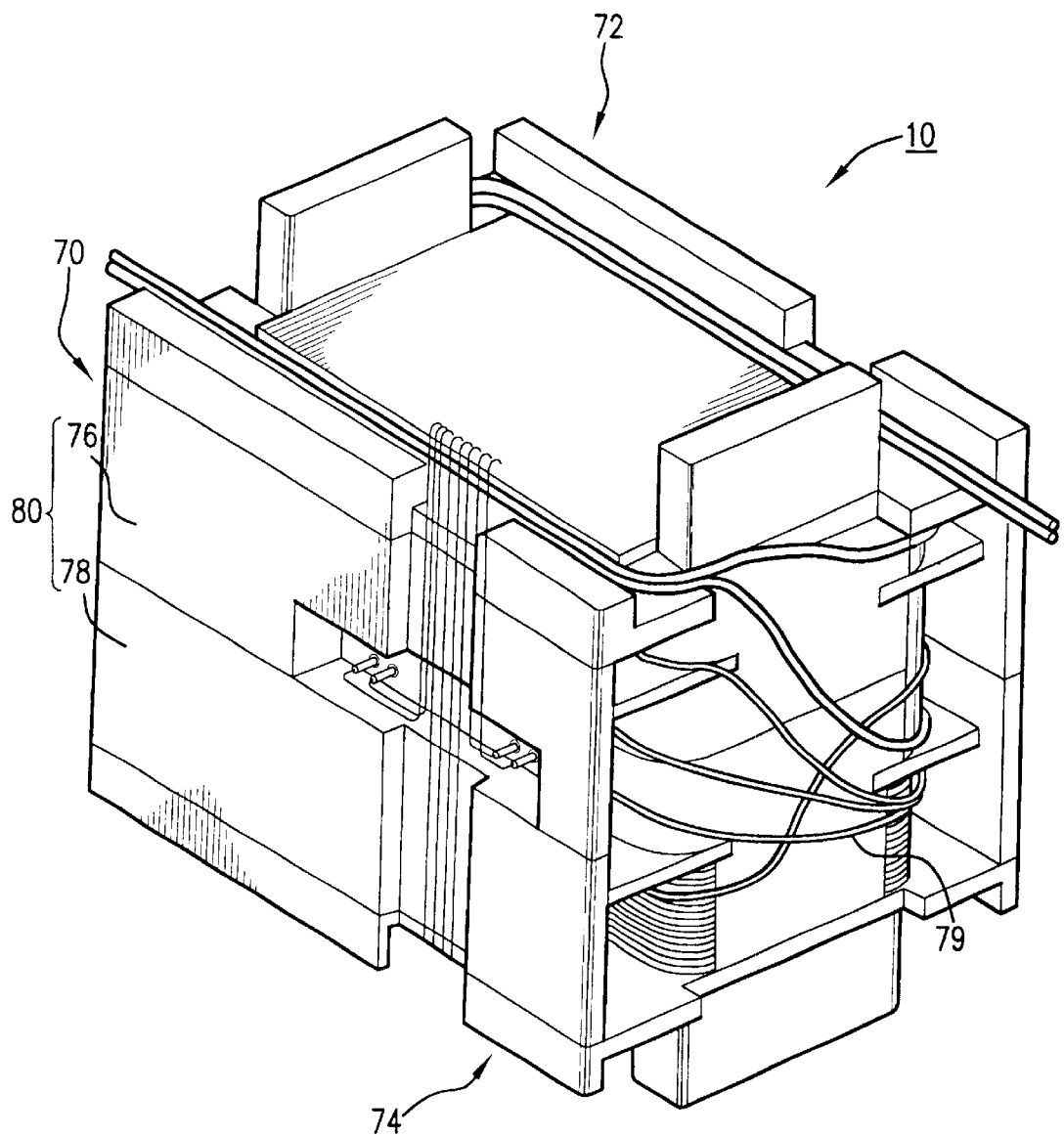
FIG. 2 is a perspective view of a module assembly of a typical optical repeater.

Thus, the present invention provides for an optical repeater including at least one module assembly that further includes base modules, with each base module being vertically positioned. The module assembly further includes a top module disposed substantially perpendicular to the base modules. The top module includes a spool structure that is adapted to accommodate optical fibers from the vertically positioned modules. Thus this module assembly presents significant advances over the known module assemblies as shown in FIG. 2. The module assembly according to an embodiment of the present invention allows for additional modules to be included in the optical repeater because of the module's vertical positioning. In addition, the unique routing/splicing arrangement located on the top module prevents optical fibers from being damaged as a result of replacing or repairing the module assembly in the optical repeater.

As discussed above, the present invention also provides for a network cover 380 having network cover lids 381 (shown in FIG. 3). Network cover lids 381 provide additional protection for the routing/splicing arrangement located on top module 370.

The disclosed embodiments are illustrative of the various ways in which the present invention may be practiced. Other embodiments can be implemented by those skilled in the art without departing from the spirit and scope of the present invention.

What is claimed is:

1. An optical repeater comprising:
   an internal structure having defined therein a longitudinal plane;
   a plurality of base modules wherein the major planes of said base modules are vertically orientated within said internal structure, said base modules each including a front face and a back face and a plurality of sides;
   wherein said faces of said base modules are positioned adjacent each other and substantially perpendicular to the longitudinal plane of the internal structure; and
   a top module positioned substantially parallel to said longitudinal plane, wherein a major plane of said top module is perpendicularly orientated with respect to said major planes of said base modules, and wherein said top module includes a spool structure adapted to house optical fibers from said base modules.

2. The optical repeater according to claim 1, where said base modules are positioned such that the longitudinal plane intersects each of the faces of the base modules.

3. The optical repeater according to claim 1, wherein one of said plurality of base modules contains a pump unit assembly tray.

4. The optical repeater according to claim 1, wherein one of said plurality of base modules contains an Erbium Doped Fiber Amplifier (EDFA) assembly tray.

5. The optical repeater according to claim 1, wherein one of said plurality of base modules is a High Loss Loop Back (HLLB) assembly tray.

6. The optical repeater according to claim 1, wherein said spool structure includes a well structure.

7. The optical repeater according to claim 1, wherein said top module further comprises a storage device.

8. The optical repeater according to claim 1, wherein said top module defines a plurality of grooves therein.

9. An optical repeater comprising:
   an internal structure having defined therein a longitudinal plane;
   at least one module assembly, said module assembly including:
      a plurality of base modules wherein the major planes of said base modules are vertically orientated, each base module having a front face and a back face and a plurality of sides wherein said base modules are positioned such that said faces are substantially perpendicular to said longitudinal plane; and
      a top module positioned substantially parallel to said longitudinal plane, wherein a major plane of said top module is perpendicularly orientated with respect to said major planes of said base modules, said top module including a spool structure, the spool structure adapted to house optical fibers from said base modules.

10. The optical repeater according to claim 9, wherein said at least one module assembly is detachably connected to said internal structure.

11. The optical repeater according to claim 9, wherein said internal structure includes a power supply assembly, a heat transfer plate, a spring plate and a network cover.

12. The optical repeater according to claim 9, wherein one of said plurality of base modules contains a pump unit assembly tray.

13. The optical repeater according to claim 9, wherein one of said plurality of base modules contains an Erbium Doped Fiber Amplifier (EDFA) assembly tray.

14. The optical repeater according to claim 9, wherein one of said plurality of base modules is a High Loss Loop Back (HLLB) assembly tray.

15. The optical repeater according to claim 9, wherein said spool structure includes a well structure.

16. The optical repeater according to claim 9, wherein said top module further comprises a storage device.

17. The optical repeater according to claim 9, wherein said top module defines a plurality of grooves therein.

18. A method for originating modules within an optical repeater comprising:
   providing an internal structure;
   defining a longitudinal plane in said internal structure;
   providing a plurality of base modules each having a front face and a back face and a plurality of sides;
   positioning said base modules wherein the major planes of said base modules are vertically orientated within said internal structure such that said faces are adjacent each other and substantially perpendicular to said longitudinal plane; and
   providing a top module disposed wherein a major plane of said top module is perpendicularly orientated with respect to said major planes of said base module, said top module including a spool structure, wherein the spool structure houses optical fibers emanating from said base modules.

19. The method according to claim 18, wherein one of said plurality of base modules is a pump unit assembly tray.

20. The method according to claim 18, wherein one of said plurality of base modules is an Erbium Doped Fiber Amplifier (EDFA) assembly tray.

21. The method according to claim 18, wherein one of said plurality of base modules is a High Loss Loop Back (HLLB) assembly tray.

22. The method according to claim 18, wherein said top module defines a plurality of grooves therein.

23. The method according to claim 18, wherein said spool structure includes a well structure.

24. The method according to claim 18, wherein said top module further comprises a storage device.

* * * * *